(12) United States Patent
Bortz

(10) Patent No.: US 10,214,378 B2
(45) Date of Patent: Feb. 26, 2019

(54) CABLE COILING MACHINE

(71) Applicant: DDJM, LLC, Glendale, CA (US)

(72) Inventor: Daniel R. Bortz, Los Angeles, CA (US)

(73) Assignee: DDJM LLC, Glendale, CA (US)

(*) Notice: Subject to any disclaimer, the term of this patent is extended or adjusted under 35 U.S.C. 154(b) by 133 days.

(21) Appl. No.: 15/487,372

(22) Filed: Apr. 13, 2017

(65) Prior Publication Data

US 2017/0297855 A1 Oct. 19, 2017

Related U.S. Application Data

(60) Provisional application No. 62/323,493, filed on Apr. 15, 2016.

(51) Int. Cl.
B65H 51/10 (2006.01)
B65H 54/56 (2006.01)
B65H 57/14 (2006.01)
D07B 3/00 (2006.01)
D07B 7/10 (2006.01)

(52) U.S. Cl.
CPC ............ B65H 54/56 (2013.01); B65H 51/10 (2013.01); B65H 57/14 (2013.01); D07B 3/00 (2013.01); D07B 7/10 (2013.01); B65H 2701/34 (2013.01); D07B 2501/406 (2013.01)

(58) Field of Classification Search
CPC ........ B65H 57/14; B65H 54/56; B65H 51/10; B65H 2701/34; D07B 7/10; D07B 2501/406
See application file for complete search history.

(56) References Cited

U.S. PATENT DOCUMENTS

| 1,850,698 A | 3/1932 | Sunderland |
| 4,165,830 A | 8/1979 | Svendsen |
| 4,513,922 A | 4/1985 | Dufour |
| 5,174,013 A | 12/1992 | Hiroshima |
| 5,853,134 A | 12/1998 | Kleppesto |

(Continued)

FOREIGN PATENT DOCUMENTS

| CA | 2810497 A1 * | 9/2014 | ............ B65H 51/10 |
| WO | WO2013180665 A1 | 12/2013 | |

OTHER PUBLICATIONS

ISR and Written Opinion for Equivalent PCT Application PCT/US2017/027978, dated Jul. 7, 2017.

*Primary Examiner* — William E Dondero
(74) *Attorney, Agent, or Firm* — Trojan Law Offices

(57) ABSTRACT

The cable coiling device automatically coils heavy-duty electrical cable into a coiled bundle having a predetermined coil diameter. This device matches the over/under coiling method used to manually coil cables that eliminate unnecessary twists and knots in cables. The cable coiling device has a first roller and a second roller that is angularly offset from the first roller. The angular offset adds a twist to the cable as it passes between the rollers. The device maintains the first and second rollers at a predetermined distance away from each other so that the cable does not slip out of the opening between the rollers. When the coil exits the rollers, the resulting cable is coil bundled and has a specific predetermined coil bundle diameter. Guide wheels positioned at specific locations guide the cable through the device, which prevents cable looping before and after the cable passes through the rollers.

16 Claims, 4 Drawing Sheets

(56) References Cited

U.S. PATENT DOCUMENTS

| | | |
|---|---|---|
| 7,690,544 B2 | 4/2010 | Zaruba |
| 2001/0005934 A1 | 7/2001 | Nakamura |
| 2008/0230643 A1 | 9/2008 | Ornskar |

* cited by examiner

CABLE COILING MACHINE

CROSS REFERENCE TO RELATED APPLICATIONS

This application claim benefit of U.S. Provisional Patent Application No. 62/323,493, filed Apr. 15, 2016.

FIELD OF THE INVENTION

This invention relates to a cable coiling machine. In particular, this invention relates to a machine for coiling cables in an "over-under" method, also known as "over-under wrapping," "flip-coiling," or "counter-coiling."

BACKGROUND OF THE INVENTION

The present invention is directed to overcoming problems associated with the coiling of heavy-duty cables, particularly electrical power cables used in lighting, audio, rigging, and power generation industries.

The way electrical cables have traditionally been coiled is to use reel-to-reel spoolers. However, a common problem with reel-to-reel spooled cables is that they become tangled when they are unwound, which can be very time consuming and labor intensive to untangle. Reel-to-reel spooling causes tangling because it is based on the traditional method of "straight coiling."

Straight coiling is the practice of coiling a cable in the same direction coil after coil. This causes the cable to be twisted because straight coiling goes against the natural twist in the cable. That is, every cable has an inherent natural twist. When a cable is straight coiled in the same direction, the cable is turned against its natural twist. As a result, straight coiling can cause the cable to twist internally, creating stress in the cable and damaging it.

It is better to coil with the natural twist in the cable and not against it. The over-under coiling method preserves the natural twist in the cable. Over-under coiling refers to a method of twisting the cable in one direction to make a first loop, and un-twisting it to make the next loop, and repeating this alternation until all the cable is neatly coiled. (This is also called "flip-coiling," due to the nature of flipping the cable back and forth.) The basic principle is that the first loop twists the cable, and the next loop untwists it.

There are a number of important advantages to the over-under coiling method. First, the method eliminates twists and tangles in the cable by allowing the cable to coil according to its natural state, thus preventing damage and prolonging the lifespan of the cable. Second, by eliminating twists and tangles in the cable, the over-under coiling method allows the cable to lie flat, which facilitates storage. A cable that is looped in the same direction as in straight coiling will not lie flat and will not stack properly. This makes the cable much more cumbersome to store and transport. When a cable is coiled using the over-under method, it can be stored compactly without damaging its internal components.

Third, a cable that is coiled using the over-under method can be easily uncoiled because there is no twist and tangle, which makes for easier and faster work. An over-under coiled cable can be quickly unwound in the field by either throwing the coil outward or just pulling on one end. In fact, when well coiled, a 100-foot (30 m) cable can be thrown across an area and land in a straight line, without tangles. In short, the over-under coiling method improves the lifespan, storage capacity, and uncoiling speed of the cable.

However, the difficulty with the over-under coiling method is that heretofore the only way to do it was by hand. However, flip coiling by hand can be very time consuming and labor intensive given the size and weight of heavy-duty electric cables. For example, the entertainment production industry uses various sizes and lengths of heavy-duty electrical power cable to deliver and distribute power from electrical panels or generators to control and power lighting fixtures, audio systems and rigging motors. The heaviest power feeder cable "4/O" is 1 inch in diameter (about 2.5 centimeters) and weighs approximately 1 pound per foot (about 0.7 kilograms per meter). An average cable 100 feet long (30 meters) will weigh approximately 100 pounds (45 kilograms). The accepted industry standard is to coil heavy-duty electrical power cables in 20-inch diameter (about 0.5 meters) coiled bundles. This diameter size makes the coiled bundle easier to store, transport, and handle.

The industry state of the art of coiling heavy-duty electrical power cables and uses conventional cable reel coiler machines to re-coil cable onto a spool. According to industry standards, the desired dimension for a coil bundle is 20 inches (0.5 meters) in diameter for ease in lifting, transportation and storage. Though over-under coiling can be done by hand, it is very time consuming and is very labor intensive to coil a 100 ft/100 lbs cable (30 m/45 kg).

Twisted coiling machines do exist in the prior art but are not designed to handle the type of heavy-duty cables used for electrical power or high-tech audio equipment, such as the one described in U.S. Pat. No. 7,690,544 to Zaruba, incorporated by reference in its entirety herein. Other coilers such as those described in U.S. Pat. No. 4,513,922 to Dufour, U.S. Patent Application Pub. No. 20080230643 to Ornskar and PCT Application Pub. No. WO2013180665 to Span, also describe different coiling machines, each hereby incorporated by reference in its entirety. However, these other coiling devices not suitable for rapid easy coiling of heavy-duty electrical cable.

Therefore, there remains a need to improve coiling devices that can coil heavy-duty cables to minimize tangling, improve coiling time, and vary the size of the coiled cable. One skilled in the art will recognize many other benefits of this new coiling device and method over apparatus and methods used to coil cables.

SUMMARY OF THE INVENTION

In view of the foregoing, it is an object of the present invention to provide a device for coiling cables using the over-under coiling method.

It is an object of the present invention to provide a device for coiling cables that can eliminate unnatural twists in the cable by allowing the cable to coil according to its natural state.

It is an object of the present invention to provide a device for coiling cables that prevents damage to the cable and prolongs its lifespan.

It is an object of the present invention to provide a device for coiling cables that allows the cable to lie flat in order to facilitate storage.

It is an object of the present invention to provide a device for coiling cables that allows the cable to be easily uncoiled without tangling.

In accordance with the objects of the present invention, the device of the present invention has the following. A first roller has a first substantially flat circumferential surface. The first roller is rotatably mounted to a shaft operationally connected to a motor (the shaft connected to the motor being a drive shaft). The first roller has a first axis of rotation along its shaft where the roller rotates around. Across from the first roller is a second roller. The second roller also has a substantially flat circumferential surface. The second roller is rotatably mounted to a shaft which has a second axis of rotation. The second axis of rotation is different from the axis of rotation relative to the first axis of rotation of the first roller. Both of the rollers are mounted to a portion of a body of the cable coiling device. The first roller and the second roller are spaced from each other, forming an opening. This opening permits a cable to pass between the first and second roller. As the cable passes through the opening, an angular offset between the rollers causes the cable between the rollers to twist as the cable passes between the two rollers against the circumferential surfaces of the rollers.

In one embodiment, the angular offset between the first and second rollers is between of 6 degrees and 12 degrees. In another embodiment, the angular offset of the two rollers is about 9 degrees.

In another embodiment the invention, the two rollers are spaced apart from each other and the spacing can be controlled by a user-selectable and adjustable member, such as a sliding element or sliding means that allows the user to slide the first roller toward or away from the second roller. Sliding means that can be adapted for the present invention may have a driving source, and electromagnetic linear actuator, a moving-magnet, amateurs, a coil board, a slider-crank mechanism, a crank and piston, or other well-known means to slide a motor or wheel linearly along a path.

In yet embodiment of the invention, a plurality of guiding members are positioned along the body of the coiling device. Some guiding members guide the cable before entry into the rollers and other guiding members guide the cable after the cable exits the rollers and guides the twisted cable away from the rollers into a cable coil bundle on the ground or container so the user can easily transport the coiled cable bundle. Guiding members reduce the chance that the cable forms unwanted loops or tangles before or after passage through the opening between the first and second rollers that twist the cable.

In yet another embodiment, the cable coiling device has a pressure sensor operatively connected to measure pressure between the cable and at least one of the rollers. An electronic control unit is connected to the pressure sensor and controls the distance between the rollers. The electronic control unit applies a predetermined amount of pressure to maintain the cable between the rollers and the cable passes through the opening between the rollers.

In yet another embodiment, the electronic control unit is connected to a position sensor that maintains a predetermined position of the first roller relative to the second roller, thereby indirectly maintaining a predetermined pressure between the rollers and the coil.

DETAILED DESCRIPTION OF THE EMBODIMENTS

Figure 1:
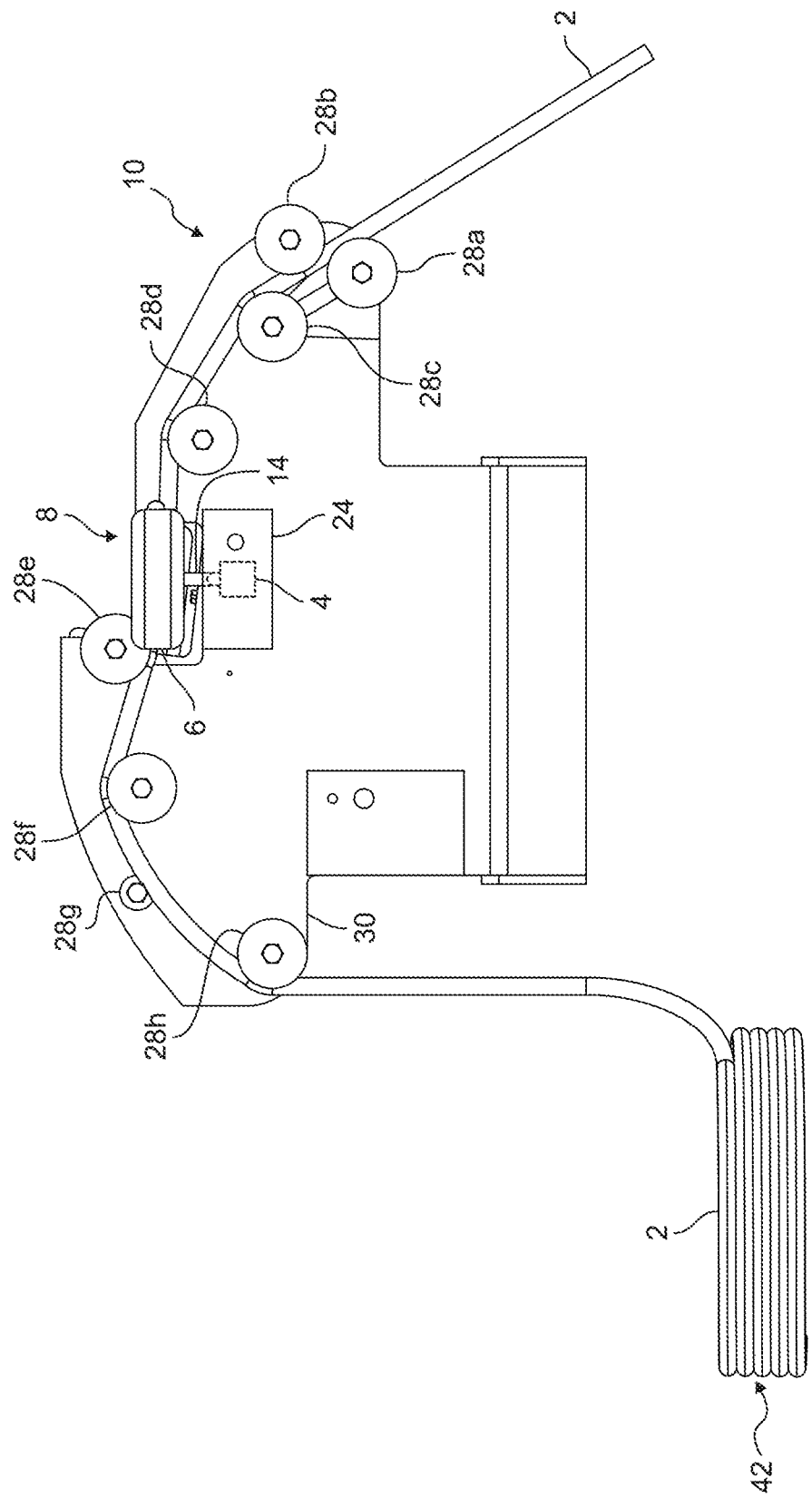
FIG. 1 is a side view of the cable coiling device.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The device is designed to pull the cable through a series of rollers and guides and while applying a precise rotation or twist needed to flip the coil and avoid any knotting or twisting. The coiling device 10 incorporates a combination of a offset rollers 8, 16, pressure, and accurately positioned guides 28a-h to enable the device 10 to feed out heavy duty power cable 2 and roll the cable 2 precisely into a 20-inch (0.51 meter) diameter bundle 42. Two rollers 8, 16 rotate in opposite direction with respect to each other, had have a precise pressure applied at an offset angle (typically 9 degrees) from vertical. This pressure and offset angle causes the cable 2, as it feeds through the rollers 8, 16, to rotate about ½ inch (1.3 cm) every 20 linear inches (0.51 meter) of cable 2 length. One loop in a 20-inch (0.51 meter) diameter bundle equals approximately 68 inches (1.73 meters) in length of cable. Every 68 inches (1.73 meters) of length of cable in a bundle preferably rotates about 1.5 inches (3.8 cm) to make the desirable flip in the cable 2, and this rotation results in a knot free and loop free 20-inch (0.51 meter) diameter bundle that is easily unwound in the field.

Once the spooling or bundling is completed, a tie line can be applied to the bundle to secure the coil from unwinding in storage or transport. The current reel-to-reel coilers do not apply the rotation to make a knot free and loop free bundle. Although the reel spooler can make uniform 20-inch (0.51 meter) bundle, but the resulting cable has a back-wind twist wound into each loop and must be untwisted in the field to get the cable untangled to lay flat. This untwisting takes too much time and energy to distribute the many power cables needed for typical entertainment productions. If one end is pulled to unwind the bundle of reel-spooled cable, there will be many back-wound loops and knots which must be taken out by hand in the field.

The present coiling device 10 saves much time and energy and can assist in over under, or flip coiling, and still makes a 20-inch (0.51 meter) bundle. If the cable 2 is flip coiled correctly there will be no twists or back winds as each loop is laid down or un-bundled. If one end of the flip coiled cable bundle is pulled, it can be unwound smoothly with no loops, knots or twist. One end can be can be pulled to lay out the cable evenly with no twisting. Having a device that can coil cable quickly is especially important because long heavy-duty cable would take a long time to properly bundle. Using the present device 10, a typical 100 foot-100-pound (30 m-45 kg) cable can be coiled in about 49 seconds, as compared to 5 or 6 minutes for coiling the same cable manually. Thus, the device saves time, human-power, and employer expenses for a job requiring placement and return of heavy-duty power cables.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Figure 2:
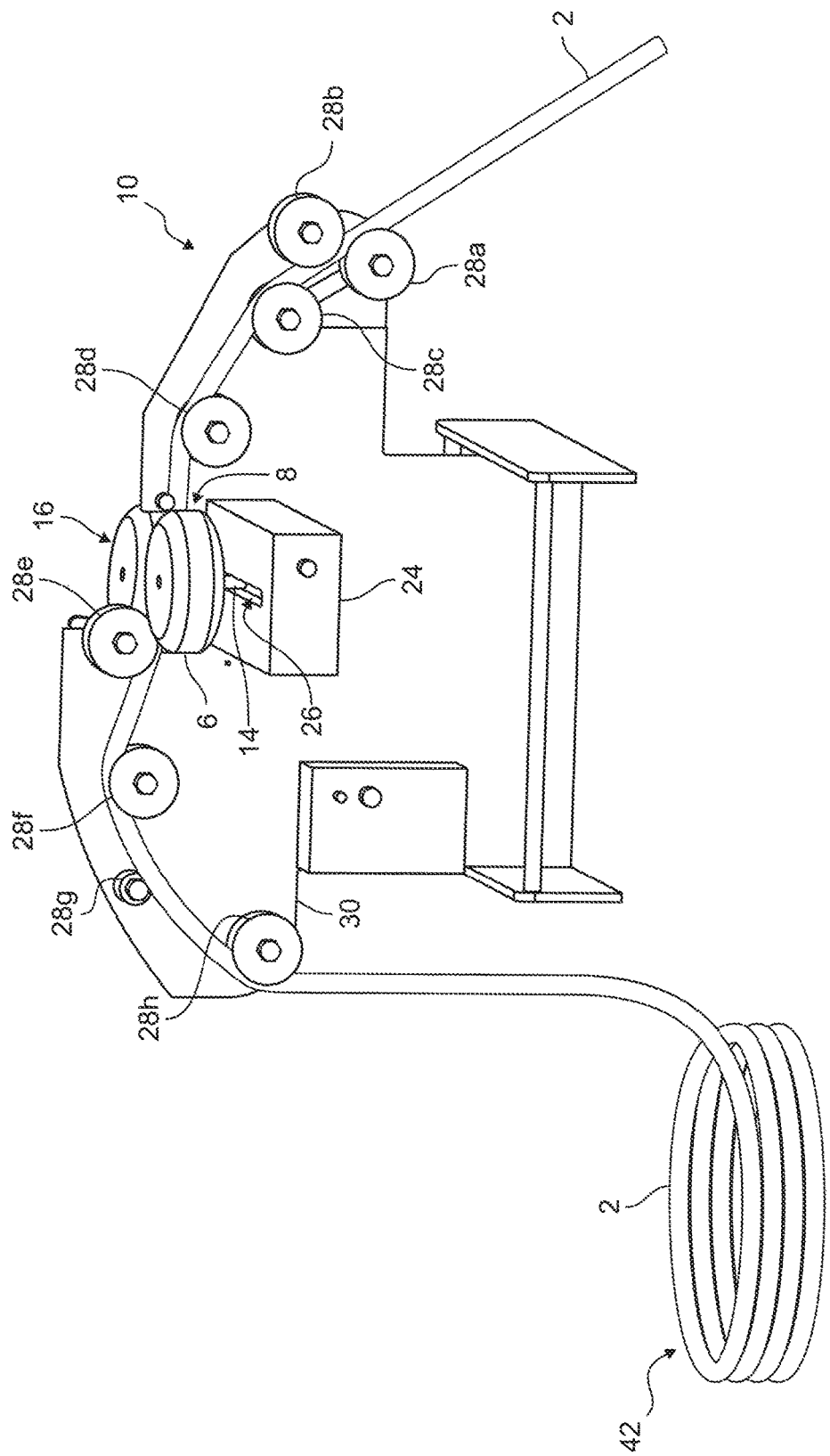
FIG. 2 is a perspective view of the cable coiling device.
Figure 3:
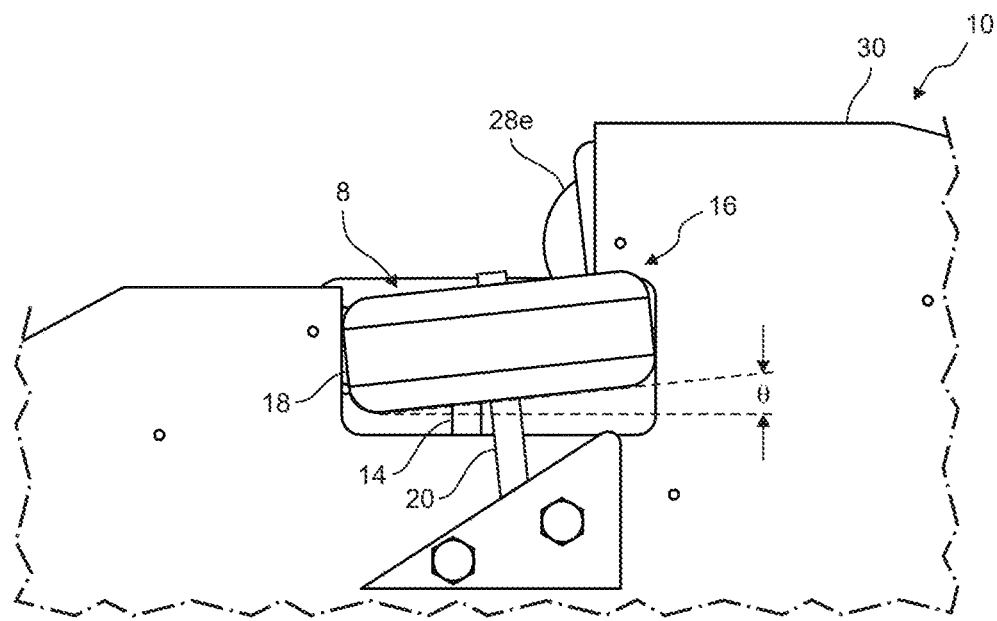
FIG. 3 is an enlarged side view of the cable coiling device showing the second roller at an angular offset from the first roller.
Figure 4:
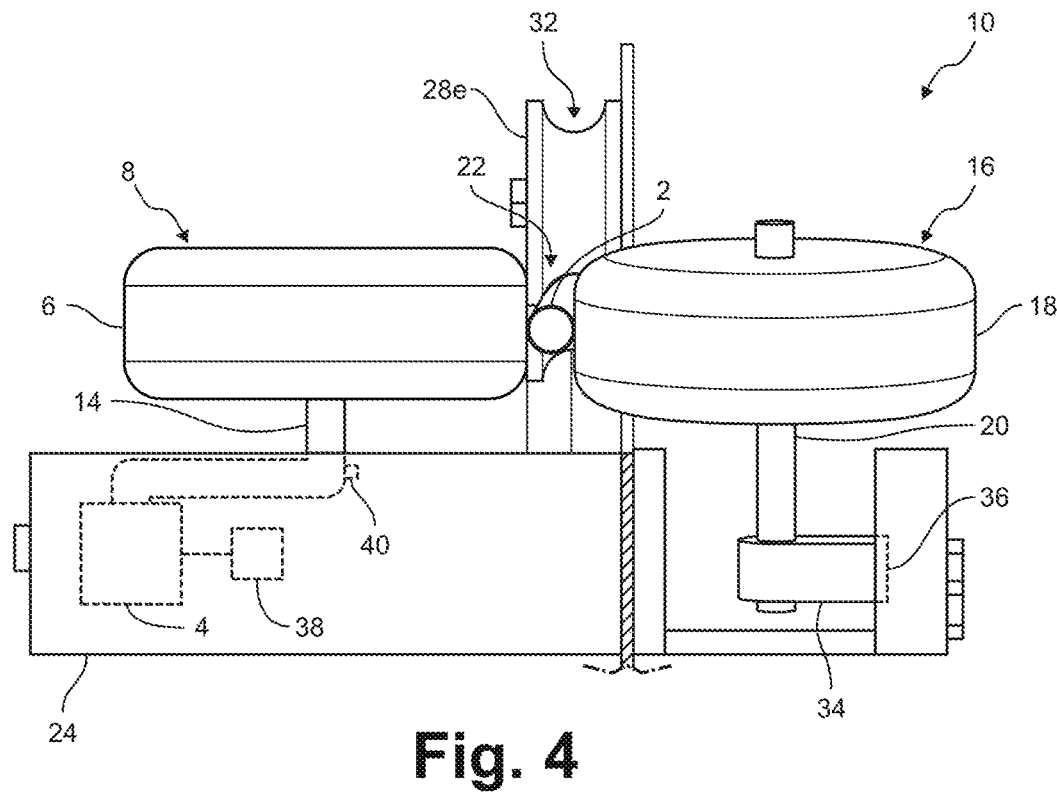
FIG. 4 is an enlarged front view of the cable coiling device showing the first roller and second roller angularly offset from each other and a cable disposed in the opening between the first and second roller.
Figure 5:
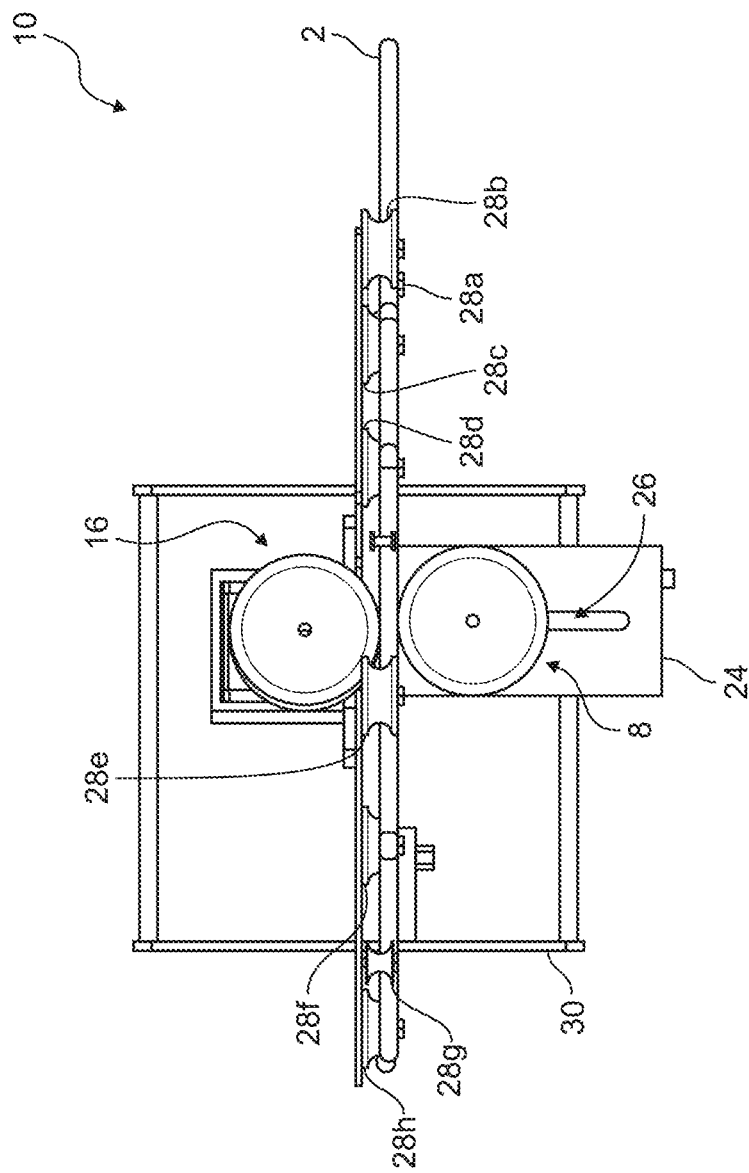
FIG. 5 is a top view of the cable coiling device.

Turning specifically to the Figures, FIGS. 1-5 show various angles and enlargements of regions of the cable coiling device 10. FIG. 1 illustrates a side view of the cable coiling device 10. FIG. 2 illustrates a perspective view of the cable coiling device 10. FIG. 3 illustrates an enlargement of the rollers of the cable coiling device shown in FIG. 1. FIG. 4 illustrates an enlargement of the front view of the cable coiling device of FIG. 1, and FIG. 5 illustrates the top view of the cable coiling device of FIG. 1.

Turning specifically to FIG. 1, and with key corresponding reference numbers shown throughout FIGS. 2-5, FIG. 1 illustrates the coiling device 10 to automatically coil a cable 2. More particularly, the coiling device 10 is a machine designed specifically for the coiling of heavy-duty electrical power cable 2 used in the entertainment industry. The device 10 has a motor 4 connected to a first roller 8 having a first shaft 14. The first roller 8 is preferably a wheel and has a substantially flat circumferential surface 6. The first shaft 14 forms a first axis of rotation for the first roller 8. The first shaft 14 is substantially perpendicular to the first roller 8. Across from the first roller 8 is a second roller 16. The second roller 16 also has a substantially flat circumferential surface 18. A second shaft 20 is substantially perpendicular to the second roller 16 and forms a second axis of rotation that the second roller rotates around. The first and second rollers 8, 16 are each mounted, directly or indirectly, to the body 30 of the cable coiling device 10. The second roller does not need to be attached to a motor, but rotates due to the tension between the cable 2 and the second roller 16 as the cable 2 passes between the rollers 8, 16. The first and second rollers, 8, 16 are spaced from each other. The opening 22 between the first and second rollers 8, 16 permits the cable 2 to simultaneously pass through the opening 22 and twist as the cable 2 contacts and passes between the first roller 8 and second roller 16 when the surface of the cable 2 contact the surfaces 6, 18 of the rollers 8, 16.

As depicted in the Figures, the first and second rollers 8, 16 are angularly offset from each other. Either roller 8, 16 may be tilted, but a preferred embodiment has the first roller 8 horizontally level (the shaft 14 vertical) and the second roller 18 angled. As depicted in FIG. 4, the shafts 14, 20 are parallel to each other along the y-axis (vertical), but the second shaft is rotated along the z-axis so that the first roller 18 is angularly offset relative to the first roller 8 by degree amount θ. By increasing θ the cable 2 makes a tighter coil as the cable 2 passes through the opening 22. In a preferred embodiment, the second roller 16 is set between 6° and 12° relative to the level first roller 8. In a more preferred embodiment, the second axis of rotation is about 9° relative to the first axis of rotation.

In a preferred embodiment, the rollers 8, 16 are pressured together (with the cable 2 between the rollers 8, 16) with about with 80 PSI (about 552 kPa). Also in a preferred embodiment, each of the rollers 8, 16 is about 8 inches (30.3 cm) in diameter. This pressure enables the rollers 8, 16 to have enough friction to capture and pull the cable 2 through the device the rollers 8, 16. An electric motor 4 is operatively connected to the first roller 8. The electric motor 4 can be any motor well-known in the art able to spin a roller via a shaft 14. The horizontally level first roller 8 applies the forward feed of the cable 2 and the angularly offset second roller 18, in combination with about 80 PSI (about 552 kPa) of compression pressure, rolls the cable 2 a precise ½ inch twist/roll of the cable 2 every linear 27 inches (0.69 meters). The 9° offset not only applies the flip or over-under coiling, but also defines the cable "bundle size" where the coiled cable has diameter between 20 and 21 inches (0.51-0.53 meters), an accepted industry standard for storing and transporting cables. In another embodiment, the angular offset between the rollers 8, 16 is approximately 12°.

As discussed above, the rollers 8, 16 are spaced apart from each other. This spacing can be adjusted by user-selectable adjustable member to control distance, such as a sliding element or sliding member. The motor 4 may be enclosed in a housing 24 and is connected to a power source (not shown). The housing 24 has an elongated aperture 26 where the first shaft 14 extends through the elongated aperture 26, so that the first shaft 14, along with the attached first roller 8, can move lengthwise along the elongated aperture 26 toward or away from the second roller 16. By sliding the shaft 14 along the aperture 26, the user can adjust the distance between the first roller 8 and the second roller 16.

To assist the cable 2 entering and exiting the opening 22 between the first and second rollers 8, 16, and to prevent the cable from inadvertently looping as it is pulled through the device 10, a plurality of cable guiding members 28a-h are positioned along the body 30 of the device 10. Any number of guiding members 28a-h may be used to guide the cable 2 along the device 10 from its uncoiled on one end to its coiled bundle 42 state on the opposite end. FIGS. 1, 2, and 5 illustrate eight guiding members 28a-h, but fewer or more guiding members can be employed to accomplish the same purpose of reducing looping of the coil as is passes from one side of the device 10 to the opposite side of the device. The guiding members 28a-h may employ a number of means to guide the cable 2. In the embodiment shown, the plurality of guiding members 28a-h are a plurality guiding wheels each having a recess 32 along their respective outer circumferences. Recesses in wheels are known in the art, as disclosed in U.S. Pat. No. 1,850,698 to Sunderland, incorporated by reference in its entirety herein. The guiding wheels 28a-h maintain traction of the cable as it passes over the wheels and preferably the depth of recesses are approximately one-third of the distance from the circumference of the guiding member to the center. Other guiding members can be envisioned, such as tubes, pipes, half-pipes, bearings, balls, or other elements that have curved or rolling surfaces that allow cable to easily pass from one side of the device 10 to the opposing side of the device 10, without looping, snagging, or tangling.

Turning to the guide wheels immediately before and after the rollers 8, 16, and shown as 28d (the first guide wheel) and 28e (the second guide wheel) in FIG. 1, these guide wheels 28d, 28e position the cable to enter and exit the opening 22 between the rollers 8, 16 so that the cable 2 does not slip out of the opening 22. The first guide wheel 28e is adapted to position the cable 2 to enter the opening 22 between the first roller 8 and the second roller 16. The second guide wheel 28e is adapted to position the cable 2 away from the first roller 8 and the second roller 16 as the cable exits the opening 22.

To position the cable 2 so that it enters the opening 22 between the first guide wheel 8 and second guide wheel 16, the cable passes over the first guide wheel 28d, which has an axis of rotation substantially perpendicular to the axis of the first roller 8. The second guide wheel 28e at least partially extends within the opening 22 between the first roller 8 and the second roller 16, thereby guiding the cable away from the first and second rollers 8, 16. The second guide wheel 28e, like the first guide wheel 28d, has an axis of rotation perpendicular to the axis of rotation of the first roller 8. In sum, the plurality of guiding members 28a-h, which include the first and second guide wheel 28d, 28e (shown on opposite sides of the first and second rollers 8, 16) keep the cable 2 feeding smoothly between the two rollers 8, 16 while the cable 2 is being pulled through and rotated to add a twist to cable 2 into a coil as it exits the device 10.

To aid the maintaining the cable 2 in the opening 22 between the first and second roller 8, 16 a minimum threshold of pressure must be applied to the cable. Since the cable 2 is being twisted by the angularly offset second roller 16, the cable 2 would naturally deviate as it passes between the two rollers 8, 16. In addition to the minimum pressure required, the rollers may be made of a flexible material, such as rubber, so that the substantially flat outer circumference 6, 18 of the first and second roller 8, 16 can flex to slightly conform to the contours of the cable 2 surface when the cable 2 is pressed against the substantially flat outer circumferences 6, 18 of the rollers 6, 18. The higher the pressure between the rollers 8, 16 and the cable 2, the more the flexible material will conform to the contours of the cable 2 and prevent the cable 2 from being displaced from the opening 22. The flexible material may be a natural or synthetic rubber and should be resilient enough to be able to conform to conform and return to its natural state when no cable is between the rollers 8, 16. In a preferred embodiment the rollers 8, 16 are air inflatable wheels. To allow the rollers 8, 16 to conform to the shape of the coil 2, the rollers 8, 16 should not be inflated to their recommended pressure, but instead should be partially deflated, between 20 and 40 percent of the standard recommended pressure. For example, if the rollers 8, 16 have a recommended PSI of 100 (689 kPa), the wheels 8, 16 should be inflated only between 60 and 80 PSI (between 413 kPa and 551 kPa).

In one embodiment, the cable coiling device 10 includes a pressure sensor 40 operatively connected to measure pressure 40 of at least one of the rollers 8, 16 against the cable 2. An electronic control unit 38 is operatively connected to the pressure sensor 40. The electronic control unit 38 is capable of controlling the distance between the first roller 8 and the second roller 16 by applying a predetermined pressure to maintain the cable between the first roller 8 and the second roller 16 as the cable 2 passes through the opening 22. In a preferred embodiment, the electronic control maintains of approximately 80 PSI (552 kPa) between the rollers 8, 16. Those having skill in the art can envision maintaining a pressure between 75 PSI (517 kPa) and 85 PSI (586 kPa) or other pressure to prevent the cable from shifting out of the opening 22 between the first and second rollers. A pressure too high would restrict movement of the cable 2 between the rollers 8, 16, while a pressure too low may allow the cable 2 to deviate from the opening between the rollers 8, 16. A preferred pressure maintains the longitudinal axis of the cable 2 in a substantially perpendicular orientation relative to the axis of rotation of the first roller 8, and also maintains the cable 2 between the first roller 8 and second roller 16 as the cable passes through the opening between the first roller 8 and the second roller 16.

In another embodiment, the pressure between the rollers 8, 16 and cable 2 is maintained not by a pressure sensor 40, but by position guidance, where the electronic control unit controls the distance between the first roller 8 and second roller 16. The pressure necessary to retain the cable 2 between the rollers 8, 16 is maintained by controlling the position of the first roller 8 relative to the second roller by adjusting the movement of the shaft 14 of the first roller 8 along the elongated aperture 26.

In addition to the distance between the first roller 8 and second roller 16 being adjustable, the second roller 16 may have an adjustable axis of rotation so that the user can vary the amount of twist in the cable 2 as the cable 2 passes between the first roller 8 and second roller 16. An increase in the angle offset between the first roller 8 and second roller 16 increases the twist of the cable 2, thereby decreasing the diameter of cable coil as the cable 2 falls to the ground (as shown in FIG. 1) into its coiled bundle 42. At container may be placed at one end of the device to catch the coiled bundle 42 as it is deposited by the last guiding member 28h. The axis of rotation can be adjusted via an adjustable rotating member 34 (shown in FIG. 4) that is coupled to the second shaft 20 of the second roller 18.

The adjustable rotating member 34 connecting to the second roller 16 can offer continuous adjustability and locked into any position, or in another embodiment can be locked to the body 30 of the device 10 at preset angles relative to the axis of rotation of the first roller 8 or body 30 of the device 10. Embodiments may include two, three, four or more positions that the adjustable rotating member 34 can be locked into position via a locking member 36. The locking member 36 may have slots (not shown) that the second roller 16 locks into, in order to lock the rotatable member 34 to a selected angular position. In a preferred embodiment, there are at least three preset positions where the adjustable rotating member 34 can be locked relative to the axis or rotation of the first roller 8 to accommodate standard sizes of cables used in the industry and to set the coil diameter size according to preferred cable coil diameter sizes in the industry. Typical angular offsets may be 3°, 6°, 9°, 12°, or 15° relative to the axis of rotation of the first roller 8.

Relative Positions of Guide Wheels

In one embodiment, shown approximately to scale in FIG. 1, the plurality of guiding members 28a-h includes three guide wheels 28a, 28b, 28c positioned in proximity to each other on one side of the device 10 that pulls the cable 2 up to the rollers 8, 16. The cable 2 is sandwiched between guide wheels 28a and 28c on the bottom and guide wheel 28b on top. In a preferred embodiment, the axis of rotation of guide wheel 28a is about 1.9 inches (4.8 cm) to the left and 4.1 inches (10.4 cm) below the axis of rotation of guide wheel 28b. The axis of rotation of guide wheel 28c is approximately 5 inches (12.7 cm) to the left and 1 inch (2.5 cm) above and of the axis of rotation of guide wheel 28b.

After the cable 2 passes through the initial guide wheels 28a-c, the cable 2 passes on top of guide wheel 28d. The axis of rotation of guide wheel 28d is approximately 6.5 inches (16.5 cm) to the left, and approximately 4 inches (10.2 cm) above the axis of rotation of guide wheel 28c. After the cable 2 passes over guide wheel 28d, the cable 2 passes through the rollers 8, 16 to the bottom of guide wheel 28e. Guide wheel 28e is partially positioned between the rollers 8, 16. In a preferred embodiment, the axis of rotation of guide wheel 28e is approximately 22 inches (55.9 cm) to the left and 5 inches (12.7 cm) above the axis of rotation of guide wheel 28d.

After the cable 2 passes through the underside of guide wheel 28e, the cable 2 passes on top of guide wheel 28f. In a preferred embodiment, the axis of rotation of guide wheel 28f is approximately 8 inches (20.3 cm) to the left and 1.5 inches (2.7 cm) below the axis of rotation of guide wheel 28e.

After the cable 2 passes over guide wheel 28f, the cable 2 passes under guide wheel 28g. The axis of rotation of guide wheel 28g is approximately 6 inches (15.2 cm) to the left and 0.25 inches (0.6 cm) above the axis of rotation of guide wheel 28f.

After the cable 2 passes under guide wheel 28f, the cable 2 passes over guide wheel 28h. The axis of rotation of guide wheel 28h is approximately 3.5 inches (8.9 cm) to the left and 7.75 inches (19.7 cm) below the axis of rotation of guide wheel 28g.

Although precise measures are given above for a preferred embodiment, those having ordinary skill in the art may modify the distances between the guide wheels by various amounts, such as plus or minus five percent, ten percent, twenty percent, or fifty percent.

After the cable 2 passes over guide wheel 28g the twisted cable 2 coils into a bundle 42 below the device 10.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

I claim:

1. A cable coiling device comprising:
   a) a first roller having a first substantially flat circumferential surface, the first roller rotatably mounted to a first shaft connected to a first motor, the first roller having a first axis of rotation along the first shaft;
   b) a second roller having a second substantially flat circumferential surface, the second roller rotatably mounted to a second shaft, the second roller having a second axis of rotation along the second shaft;
   wherein the first roller and the second roller are each mounted to a body of the cable coiling device;
   wherein the first roller is spaced from the second roller, therein forming an opening between the first roller and the second roller, the opening permitting a cable to simultaneously pass through the opening and twist as the cable contacts and passes between the first roller and second roller; and
   an electronic control unit operatively connected to the first shaft, the electronic control unit capable of controlling the distance between the first roller and the second roller to maintain the cable between first roller and the second roller as the cable passes through the opening between the first roller and the second roller.

2. The cable coiling device of claim 1, wherein the first axis of rotation and the second axis of rotation are angularly offset from each other between 6 degrees and 12 degrees.

3. The cable coiling device of claim 1, wherein the first axis of rotation and the second axis of rotation are angularly offset from each other by approximately 9 degrees.

4. The cable coiling device of claim 1, wherein the first roller and the second roller are spaced apart from one another and spaced apart by a user-selectable and adjustable sliding member.

5. The cable coiling device of claim 1, wherein the body has a housing having an elongated aperture, wherein the first shaft extends through the elongated aperture and the first shaft is capable of sliding lengthwise along the elongated aperture, thereby permitting a user to adjust the distance between the first roller and the second roller.

6. The cable coiling device of claim 1, wherein the second roller has a user adjustable axis of rotation, thereby allowing a user to vary the amount of twist in a cable as the cable passes between the first roller and the second roller, and thereby permitting a user to control a coil length.

7. The cable coiling device of claim 1, further comprising a plurality of guiding members, wherein the plurality of guiding members are adapted to either guide the cable into or away from the opening between the first roller and the second roller.

8. The cable coiling device of claim 7, wherein the plurality of cable guiding members comprise:
   a first guide wheel adapted to position the cable to enter the opening between the first roller and the second roller;
   a second guide wheel adapted to guide the cable away from the first roller and the second roller as the cable exits the opening; and,
   wherein the first roller and the second roller are each positioned substantially between the first guide wheel and the second guide wheel.

9. The cable coiling device of claim 8, wherein the first guide wheel and the second guide wheel each has an axis of rotation substantially perpendicular to the axis of rotation of the first roller; and,
wherein the second guide wheel at least partially extends within the opening between the first roller and the second roller, thereby guiding the cable away from the first roller and the second roller as the cable exits the opening and passes from one end of the device to an opposite end of the device.

10. The cable coiling device of claim 8, wherein the first guide wheel and the second guide wheel each has a recess designed to retain the cable within the recess as the cable is pulled along the cable coiling device; and,
wherein the first and second guide wheels are aligned with the opening between the first roller and the second roller.

11. The cable coiling device of claim 1, wherein the first substantially flat circumferential surface of the first roller and the second substantially flat circumferential surface of the second roller are each comprised of a flexible material capable of at least partially conforming to a contour of a surface of the cable.

12. The cable coiling device of claim 1, wherein the electronic control unit maintains a predetermined distance between the first roller and the second roller such that a pressure between the cable the first roller and the second roller is between 75 PSI (517 kPa) and 85 PSI (586 kPa), whereby the predetermined distance maintains the cable in a substantially perpendicular orientation relative to the axis of rotation of the first roller and also maintains the cable between the first roller and the second roller as the cable passes through the opening between the first roller and the second roller.

13. A cable coiling device comprising:
a) a first roller having a first substantially flat circumferential surface, the first roller rotatably mounted to a first shaft connected to a first motor, the first roller having a first axis of rotation along the first shaft;
b) a second roller having a second substantially flat circumferential surface, the second roller rotatably mounted to a second shaft, the second roller having a second axis of rotation along the second shaft;
wherein the first roller and the second roller are each mounted to a body of the cable coiling device;
wherein the first roller is spaced from the second roller, therein forming an opening between the first roller and the second roller, the opening permitting a cable to simultaneously pass through the opening and twist as the cable contacts and passes between the first roller and second roller; and
wherein the second roller has an adjustable axis of rotation relative to the axis of rotation of the first roller, the axis of rotation of the second roller adjustable via an adjustable rotating member connected to the second shaft of the second roller.

14. The cable coiling device of claim 13, wherein the adjustable rotating member has at least three preset angles of rotation relative to the axis of rotation of the first roller.

15. The cable coiling device of claim 14, wherein the rotatable member is held in a selected angular position and a locking member is adapted to lock the rotatable member in the selected angular position.

16. A cable coiling device comprising:
a) a first roller having a first substantially flat circumferential surface, the first roller rotatably mounted to a first shaft connected to a first motor, the first roller having a first axis of rotation along the first shaft;
b) a second roller having a second substantially flat circumferential surface, the second roller rotatably mounted to a second drive shaft, the second roller having a second axis of rotation along the second shaft;
wherein the first roller and the second roller are each mounted to a body of the cable coiling device;
wherein the first roller is spaced from the second roller, therein forming an opening between the first roller and the second roller, the opening permitting a cable to simultaneously pass through the opening and twist as the cable contacts and passes between the first roller and second roller;
wherein the first axis of rotation and the second axis of rotation are angularly offset from each other between 6 degrees and 12 degrees;
wherein the first roller and the second roller are spaced apart from one another and spaced apart by a user-selectable and adjustable sliding member;
wherein the body has a housing having an elongated aperture, wherein the first shaft extends through the elongated aperture and the first shaft is capable of sliding lengthwise along the elongated aperture, thereby permitting a user to adjust the distance between the first roller and the second roller;
wherein the second roller has a user adjustable axis of rotation, thereby allowing a user to vary the amount of twist in a cable as the cable passes between the first roller and the second roller, and thereby permitting a user to control a coil diameter length;
a first guide wheel adapted to position the cable to enter the opening between the first roller and the second roller;
a second guide wheel adapted to guide the cable away from the first roller and the second roller as the cable exits the opening; and,
wherein the first roller and the second roller are each positioned substantially between the first guide wheel and the second guide wheel;
wherein the first guide wheel and the second guide wheel each have an axis of rotation substantially perpendicular to the axis of rotation of the first roller; and,
wherein the second guide wheel at least partially extends within the opening between the first roller and the second roller, thereby guiding the cable away from the first roller and the second roller as the cable exits the opening and passes from one end of the device to an opposite end of the device;
wherein the first and second guide wheels each has a recess designed to retain the cable within the recess as the cable is pulled along the cable coiling device; and,
wherein the first and second guide wheels are aligned with the opening between the first roller and the second roller;
wherein the first substantially flat circumferential surface of the first roller and the second substantially flat circumferential surface of the second roller are each comprised of a flexible material capable of at least partially conforming to a contour of a surface of the cable;
an electronic control unit operatively connected to the first shaft, the electronic control unit capable of controlling the distance between the first roller and the second roller to maintain the cable between first roller and the second roller as the cable passes through the opening between the first roller and the second roller;

wherein the electronic control unit maintains a predetermined distance between the first roller and the second roller such that a pressure between the cable the first roller and the second roller is between 75 PSI (517 kPa) and 85 PSI (586 kPa), whereby the predetermined distance maintains the cable in a substantially perpendicular orientation relative to the axis of rotation of the first roller and also maintains the cable between the first roller and the second roller as the cable passes through the opening between the first roller and the second roller;

wherein the second roller has an adjustable axis of rotation relative to the axis of rotation of the first roller, the axis of rotation of the second roller adjustable via an adjustable rotating member connected to the shaft of the second roller;

wherein the adjustable rotating member has at least three preset angles of rotation relative to the axis of rotation of the first roller; and, wherein the rotatable member is held in a selected angular position and a locking member is adapted to lock the rotatable member in the selected angular position.

\* \* \* \* \*